United States Patent
Wei

(10) Patent No.: US 12,503,192 B2
(45) Date of Patent: Dec. 23, 2025

(54) MAGNETIC BICYCLE HEADSET

(71) Applicant: TIEN HSIN INDUSTRIES CO., LTD., Taichung (TW)

(72) Inventor: Wei-Chih Wei, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 405 days.

(21) Appl. No.: 18/222,908

(22) Filed: Jul. 17, 2023

(65) Prior Publication Data

US 2025/0026432 A1    Jan. 23, 2025

(51) Int. Cl.
*B62K 21/06*    (2006.01)

(52) U.S. Cl.
CPC .................................. *B62K 21/06* (2013.01)

(58) Field of Classification Search
CPC ...................................................... B62K 21/06
See application file for complete search history.

(56) References Cited

U.S. PATENT DOCUMENTS

2025/0282443 A1* 9/2025 Thumm ................ B62K 19/40

FOREIGN PATENT DOCUMENTS

EP           4180310 A1 *  5/2023  ............ B62K 21/06
WO    WO-2023275340 A2 *  1/2023  ............ B62K 19/32

* cited by examiner

*Primary Examiner* — Kevin Hurley
(74) *Attorney, Agent, or Firm* — Apex Juris, pllc; Cera Oh

(57) ABSTRACT

A magnetic bicycle headset includes a first casing engaged with a headtube of a bicycle and a second casing engaged with a fork of the bicycle. A bearing abuts between the first casing and the second casing. The first casing has a first magnet seat for arranging a plurality of first magnets around an axis of the first casing. The second casing has an electrical conductor ring rotating relative to the first magnet around the axis of the first casing. A magnetic field of each first magnet movably passes through the electrical conductor ring. When the electrical conductor ring rotates relative to the first magnets, an eddy current between the electrical conductor ring and the first magnets generates a countering resistance resisting the rotation, so that the present disclosure could reduce a speed and a degree of the rotation of the second casing and the fork relative to the headtube.

7 Claims, 13 Drawing Sheets

MAGNETIC BICYCLE HEADSET

BACKGROUND OF THE INVENTION

Technical Field

The present disclosure relates generally to a device of a bicycle, and more particularly to a magnetic bicycle headset.

Description of Related Art

When a conventional bicycle is about to turn, a user is only required to adjust a center of gravity of the user to slightly adjust a direction of a front wheel through a stem, so that the bicycle could turn according to a direction of the center of gravity of the user being adjusted. Additionally, as a rotating degree of the stem is restricted by a frame, the rotating degree of the stem rotating leftward or rotating rightward is generally restricted during riding the bicycle.

However, when the bicycle is about to turn, a fork of the bicycle may suddenly turn from an original turning position due to the stem encountering an additional force or an accidental collision. Thus, the front wheel will change from smoothly rotating to suddenly generating friction with the floor to stop moving forward, so that the user falls down to the floor due to inertia. In some cases of riding the bicycle, e.g. when the stem of the bicycle has a basket carrying a load, the aforementioned risk will be increased. For the sake of safety, a countering resistance should be provided when the fork of the bicycle suddenly turns, so that the risk of falling down from the bicycle due to the sudden turn of the fork of the bicycle could be prevented.

BRIEF SUMMARY OF THE INVENTION

As the conventional bicycle lacks the countering resistance for the sudden turn of the fork of the bicycle, the safety of riding the conventional bicycle is not enhanced. In view of the above, the primary objective of the present disclosure is to provide a magnetic device, which could generate a countering resistance adapted to resist the turn of the fork of bicycle when the fork of the bicycle suddenly turns, so that a speed and a degree of the rotation of the fork of the bicycle could be reduced, thereby preventing the risk of falling down from the bicycle.

The present disclosure provides a magnetic bicycle headset, including a first casing, a second casing, and a bearing. The first casing is adapted to be engaged with a headtube of a bicycle and has an axis and a first abutting surface. The second casing is adapted to be engaged with a fork of the bicycle and has a second abutting surface. The bearing is disposed between the first abutting surface and the second abutting surface. Either the first casing or the second casing has a first magnet seat. The first magnet seat has at least one first magnet, wherein a magnetic field of the at least one first magnet has a first magnetic field direction. The other one of the first casing and the second casing has an electrical conductor ring. The electrical conductor ring rotates relative to the at least one first magnet around the axis, making the magnetic field of the at least one first magnet movably passes through the electrical conductor ring.

When the magnetic bicycle headset of the present disclosure is used, the first casing and the second casing are respectively engaged with the headtube of the bicycle and the fork of the bicycle. When the fork drives the second casing to rotate relative to the first casing fixed on the headtube, the electrical conductor ring rotates relative to the at least one first magnet of the first magnet seat, so that the magnetic flux passing through the electrical conductor ring changes, thereby generating the induced eddy current on the surface of the electrical conductor ring. By the interaction between the magnetic field of the eddy current and the magnetic field of the at least one first magnet, the countering resistance adapted to resist the rotation of the second casing and the fork is generated, so that the speed and the degree of the relative rotation of the electrical conductor ring and the at least one first magnet could be reduced, thus the speed and the degree of the rotation of the second casing and the fork relative to the headtube could be reduced. In this way, the danger of falling down from the bicycle due to the stem suddenly oversteering when the stem accidentally turns could be prevented.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
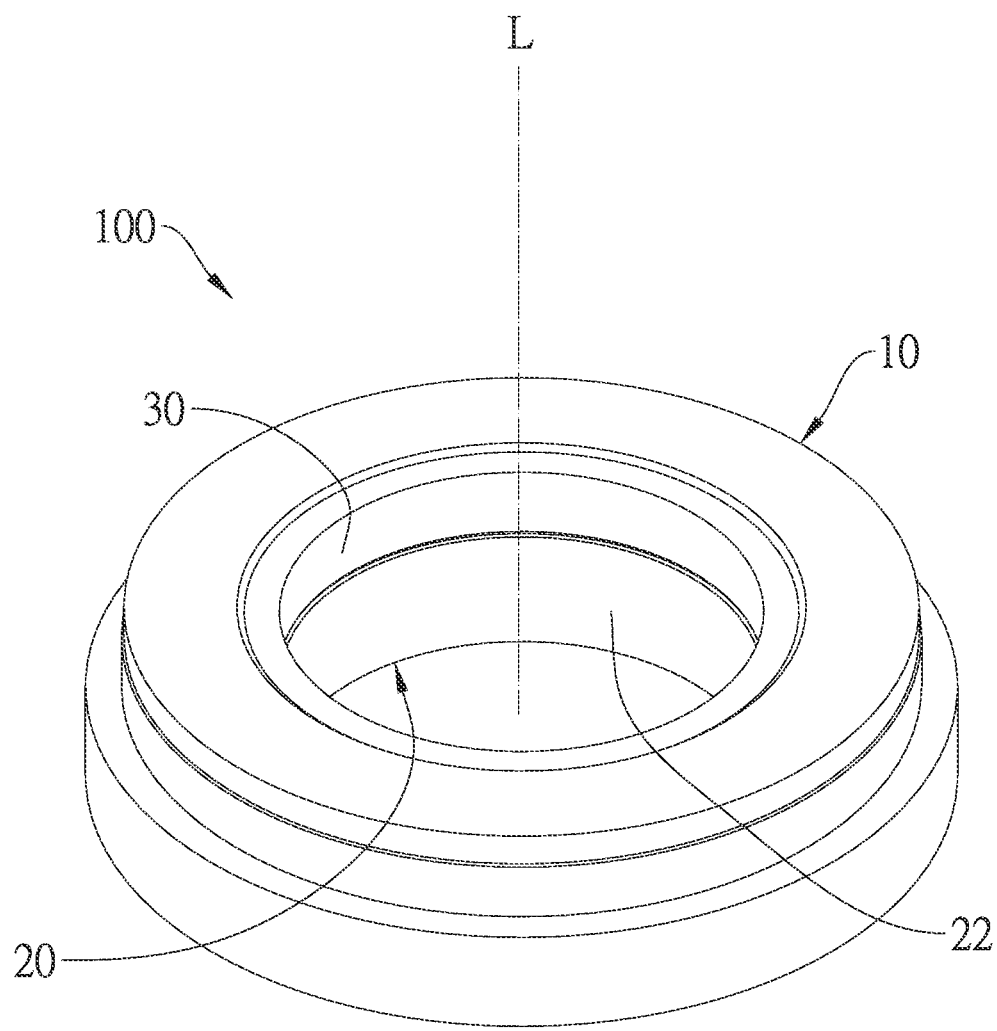
FIG. 1 is a perspective view of the magnetic bicycle headset according to a first embodiment of the present disclosure.
Figure 2:
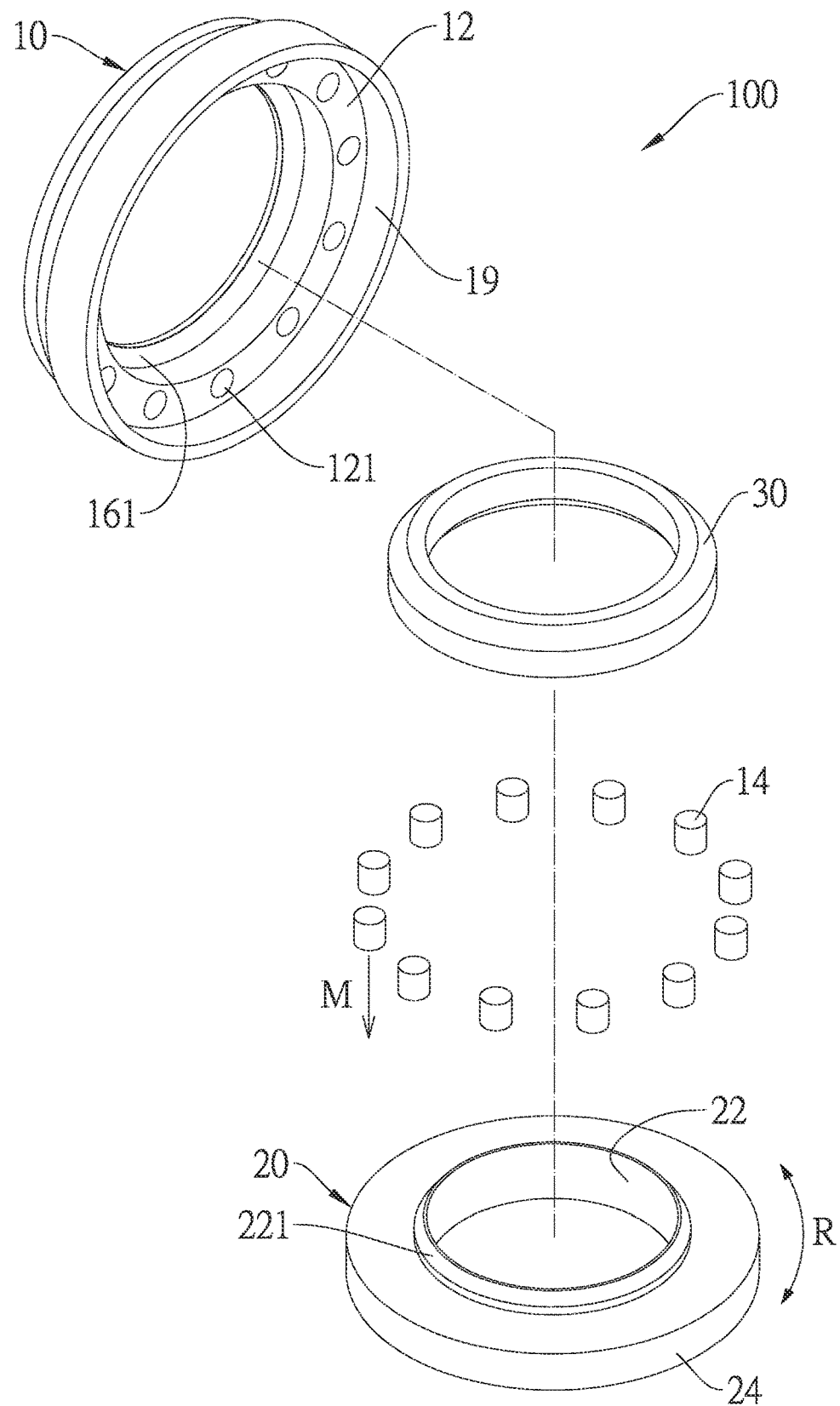
FIG. 2 is an exploded view of the magnetic bicycle headset according to the first embodiment of the present disclosure.
Figure 3:
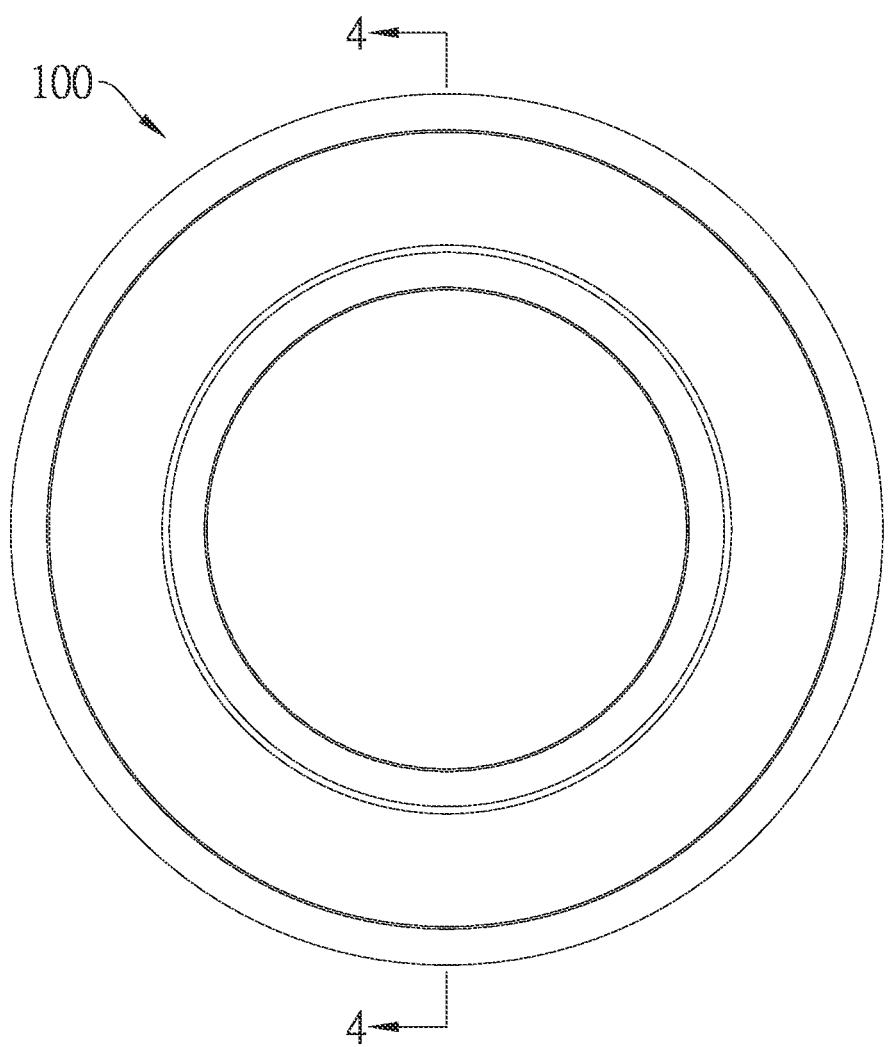
FIG. 3 is a top view of the magnetic bicycle headset according to the first embodiment of the present disclosure.
Figure 4:
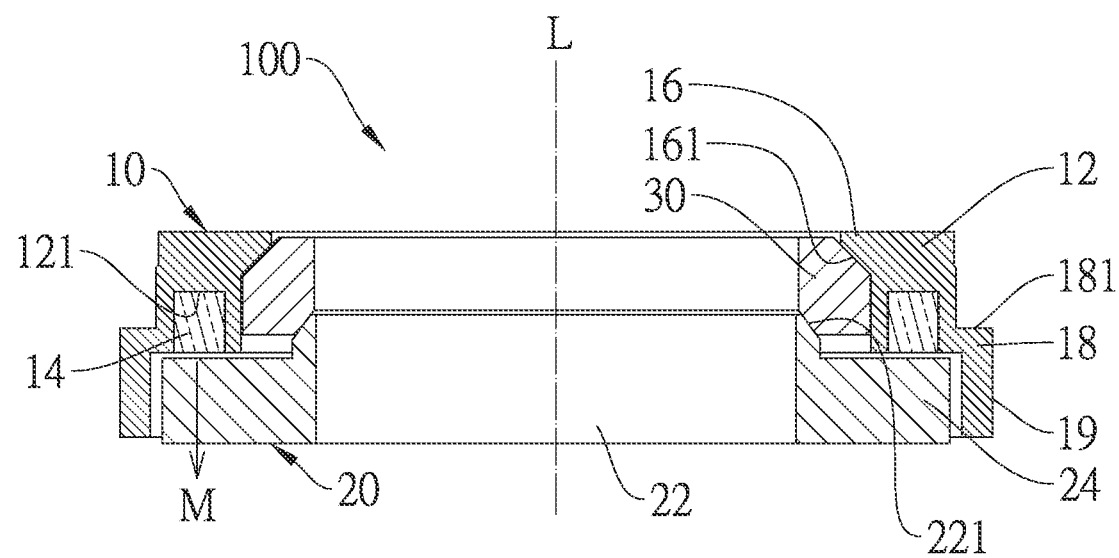
FIG. 4 is a sectional view along the 4-4 line in FIG. 3.
Figure 5:
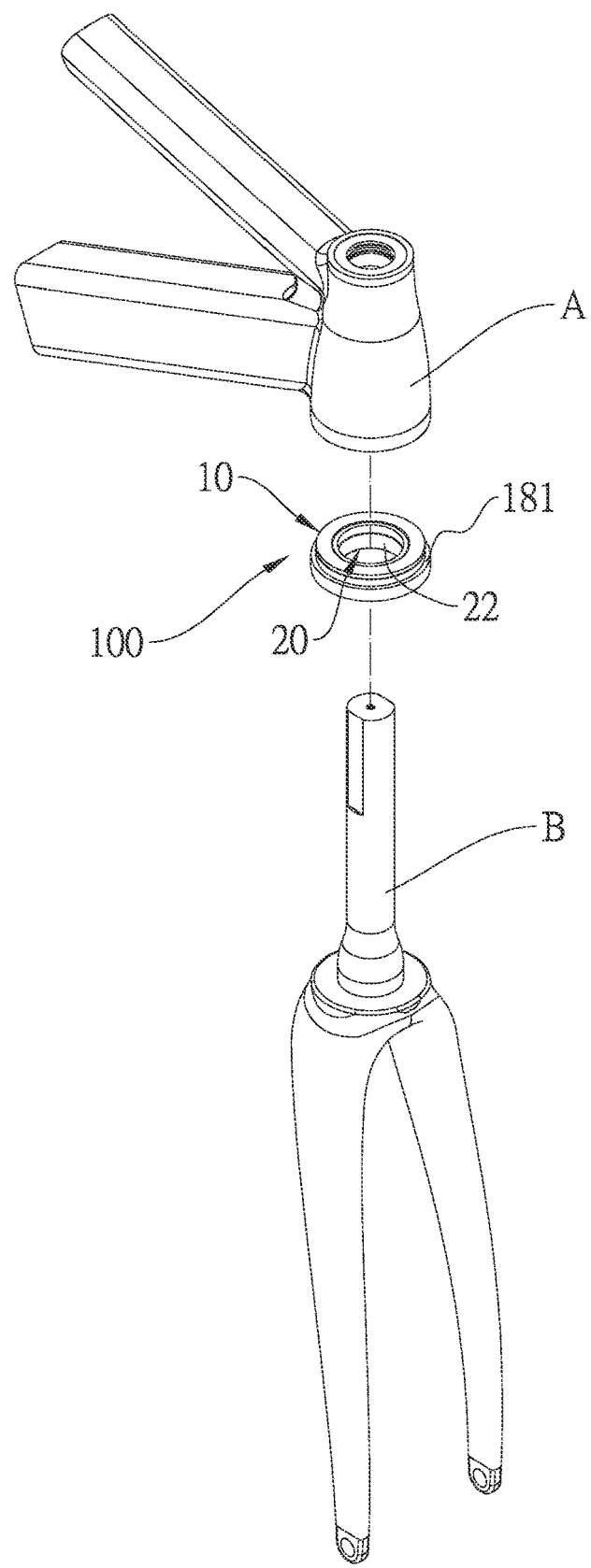
FIG. 5 is a schematic view, showing a part of the bicycle being exploded when the magnetic bicycle headset according to the first embodiment of the present disclosure is mounted on the bicycle.
Figure 9:
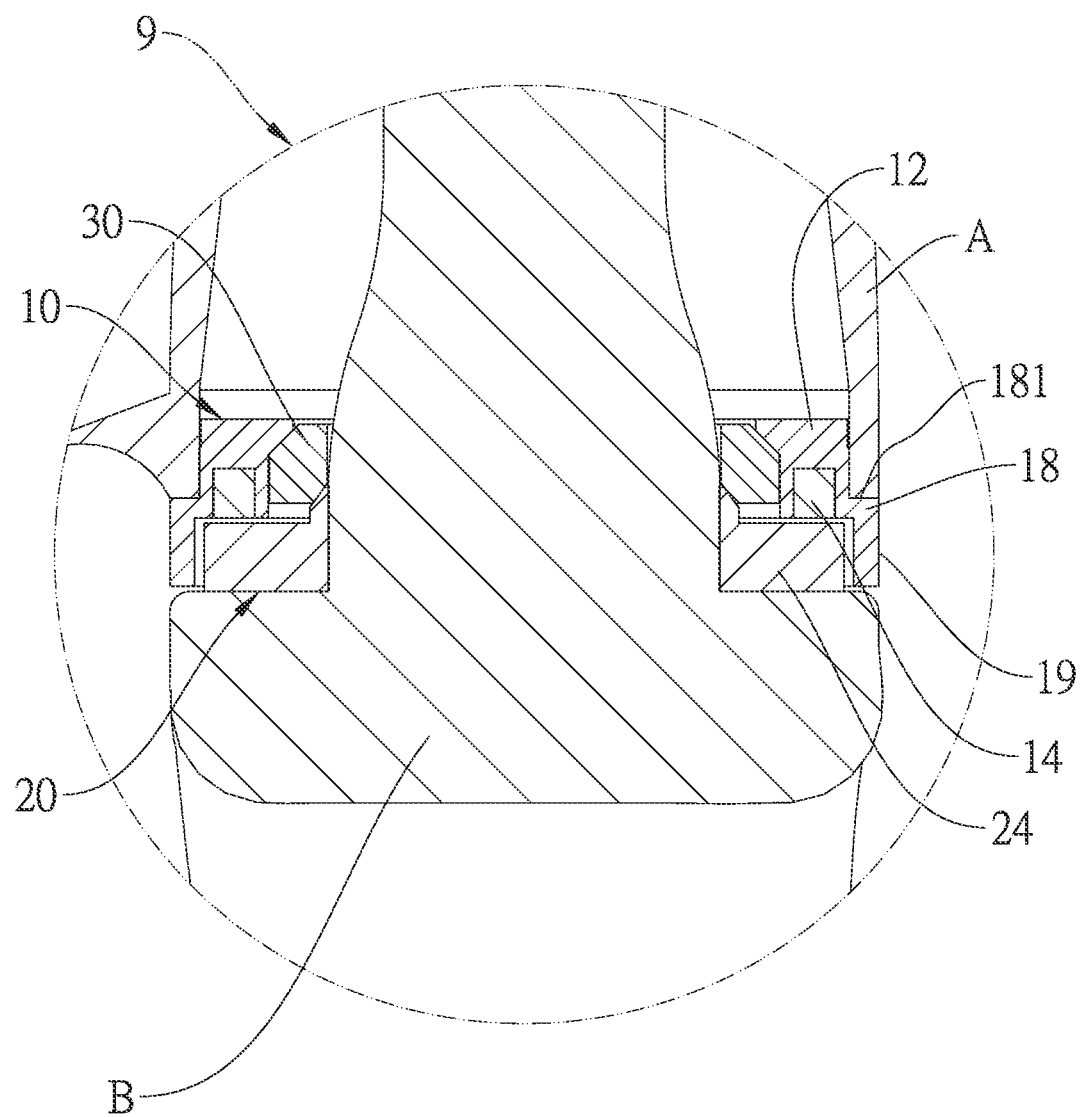
FIG. 9 is an enlarged view of a marked region in FIG. 8.

A magnetic bicycle headset 100 according to a first embodiment of the present disclosure is illustrated in FIG. 1 to FIG. 5 and FIG. 9 and includes a first casing 10, a second casing 20, and a bearing 30. The first casing 10 is adapted to be engaged with a headtube A of a bicycle. The second casing 20 is adapted to be engaged with a fork B of the bicycle. The bearing 30 is disposed between the first casing 10 and the second casing 20.

The first casing 10 has a first magnet seat 12. The first magnet seat 12 is an annular body, and a center of the first magnet seat 12 has an axis L. When the first casing 10 is engaged with the headtube A, at least a portion of the first magnet seat 12 fits in a tubular wall of the headtube A. A plurality of first magnets 14 is arranged at uniform intervals around the first magnet seat 12, so that the first magnets 14 are arranged around the axis L of the first casing 10. A magnetic field of each of the first magnets 14 has a first magnetic field direction M. In the first embodiment, the first magnetic field direction M points downward along a direction of the axis L. An inner peripheral surface of the first magnet seat 12 in a radial direction of the first magnet seat 12 has an inner protrusion 16 that is annular. The inner protrusion 16 is formed on a top side of the inner peripheral surface of the first magnet seat 12 in the radial direction of the first magnet seat 12 and has a first abutting surface 161 adapted to work with the bearing 30, wherein the first abutting surface 161 is an inclined surface.

The second casing 20 is an annular body and is opposite to the first casing 10 in the direction of the axis L. The second casing 20 has an annular main body 22. When the second casing 20 is engaged with the fork B, the annular main body 22 fits around a periphery of the fork B for fixing. A second abutting surface 221 is formed on an end edge of the annular main body 22 facing the first abutting surface 161 (i.e., a top of the annular main body 22) and is adapted to work with the bearing 30. A periphery of the annular main body 22 is connected to an electrical conductor ring 24. The electrical conductor ring 24 has a rotation direction R around the axis L. A magnetic field of each of the first magnets 14 passes through the electrical conductor ring 24, and the first magnetic field direction M of each of the first magnets 14 and the rotation direction R of the electrical conductor ring 24 intersect. In the first embodiment, the second casing 20 is a metallic electric conductor, the annular main body 22 and the electrical conductor ring 24 are integrally formed as a monolithic unit, the electrical conductor ring 24 directly faces the first magnets 14 in the direction of the axis L, and the first magnetic field direction M passes through the electrical conductor ring 22.

Two opposite sides of the bearing 30 respectively abut against the first abutting surface 161 and the second abutting surface 221 for fixing. Thus, the bearing 30 is disposed between the first abutting surface 161 and the second abutting surface 221, so that the second casing 20 is smoothly rotatable relative to the first casing 10 along the rotation direction R. In other embodiments, the number of the first magnets 14 of the first magnet seat 12 could be one or plural; when the number of the first magnet 14 is one, the first magnet 14 could be a magnet in an annular shape. In the first embodiment, the first magnets 14 are arranged at uniform intervals, but not limited thereto. In other embodiments, the first magnets 14 could be arranged at uniform intervals, different intervals, or a combination thereof. In the first embodiment, the annular main body 22 of the second casing 20 and the electrical conductor ring 24 are integrally formed as a monolithic unit, but not limited thereto. In other embodiments, the annular main body 22 and the electrical conductor ring 24 could be made of different materials, and the electrical conductor ring 24 could be connected to the periphery of the annular main body 22 for fixing through being stuck, riveting, welding, or screwing.

Figure 6:
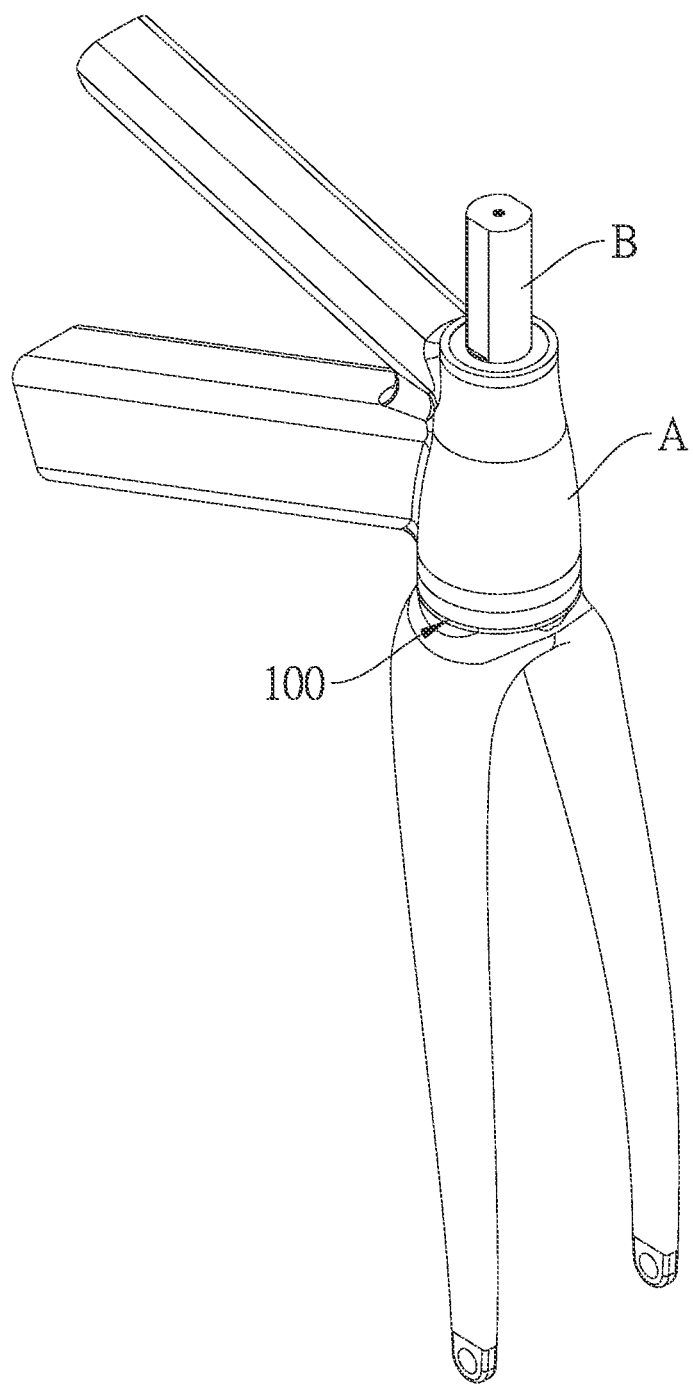
FIG. 6 is a perspective view, showing the magnetic bicycle headset according to the first embodiment of the present disclosure is mounted on the bicycle.
Figure 7:
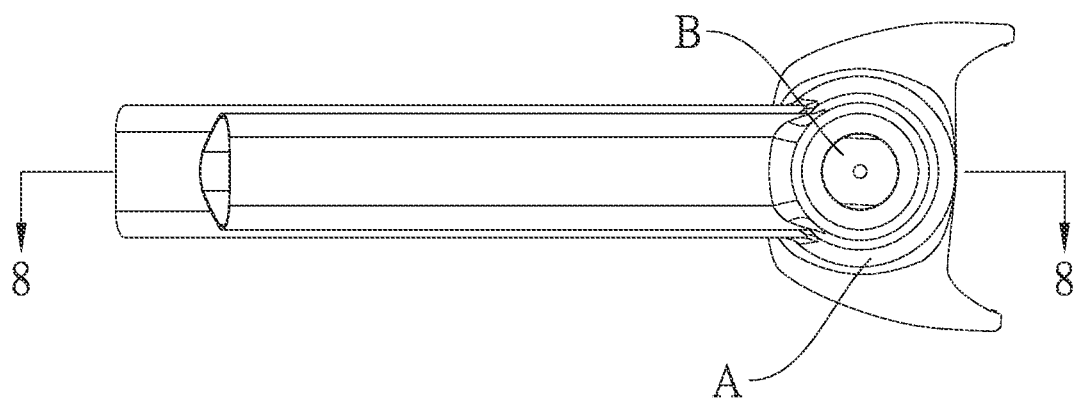
FIG. 7 is a top view, showing the magnetic bicycle headset according to the first embodiment of the present disclosure is mounted on the bicycle.
Figure 8:
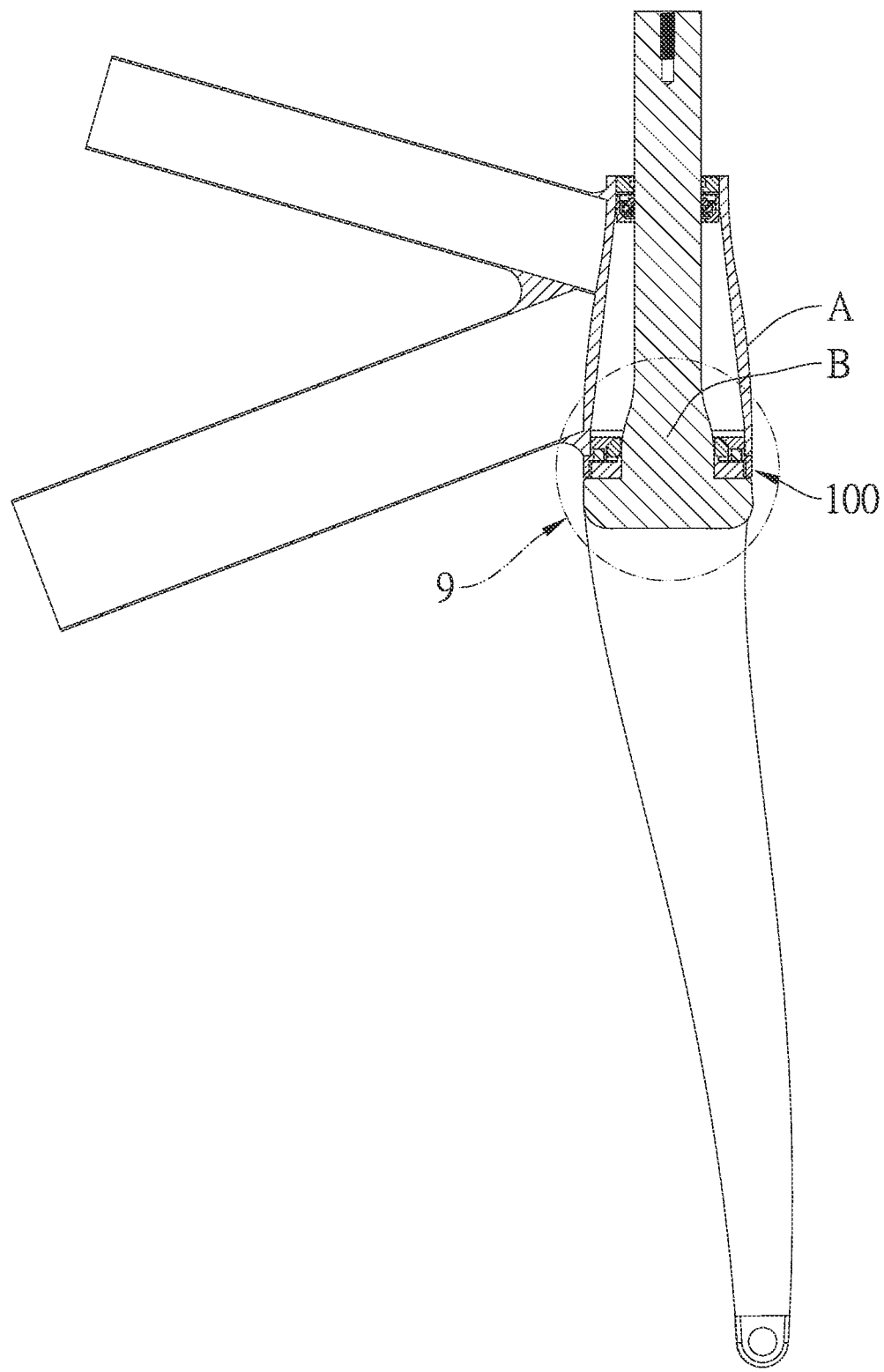
FIG. 8 is a sectional view along the 8-8 line in FIG. 7.

Referring to FIG. 5 to FIG. 9, when the magnetic bicycle headset 100 according to the first embodiment of the present disclosure is mounted on the bicycle, a fitting portion 181 of the first casing 10 is inserted into the headtube A, so that a positioning flange 18 abuts against an end edge of a bottom of the headtube A for fixing. The second casing 20 fits around the periphery of the fork B for fixing, so that the second casing 20 and the electrical conductor ring 24 of the second casing 20 are rotatable relative to the first casing 10 and the first magnets 14 of the first casing 10.

When the fork B drives the second casing 20 to rotate relative to the first casing 10 fixed on the headtube A, the electrical conductor ring 24 rotates relative to the first magnets 14 of the first magnet seat 12, so that a magnetic flux of the magnetic field of each of the first magnets 14 passing through the electrical conductor ring 24 changes, thereby generating an induced eddy current on a surface of the electrical conductor ring 24. By an interaction between a magnetic field of the eddy current and the magnetic field of each of the first magnets 14, a countering resistance adapted to resist the rotation of the second casing 20 and the fork B is generated, so that a speed and a degree of the relative rotation of the electrical conductor ring 24 and the first magnets 14 could be reduced, and a speed and a degree of the rotation of the second casing 20 and the fork B relative to the headtube A could be reduced. In this way, when a stem accidentally turns, the danger of falling down from the bicycle due to the stem suddenly oversteering could be prevented.

As shown in FIG. 2, FIG. 4, and FIG. 5 to FIG. 9, a plurality of first slots 121 is arranged around a surface of the first magnet seat 12 facing the annular main body 22 in the direction of the axis L (i.e., a bottom surface of the first magnet seat 12). Each of the first magnets 14 fits in one of the first slots 121 for fixing. A bottom side of an outer peripheral surface of the first magnet seat 12 has the positioning flange 18. The positioning flange 18 and the periphery of the first magnet seat 12 jointly form the fitting portion 181. The first casing 10 is inserted into the headtube A through the fitting portion 181. The positioning flange 18 abuts against the end edge of the headtube A for positioning. A dustproof ring 19 is connected to the positioning flange 18 and extends downward from a bottom of the positioning flange 18 along the direction of the axis L. The dustproof ring 19 and the electrical conductor ring 24 of the second casing 20 are spaced and the dustproof ring 19 surrounds a periphery of the electrical conductor ring 24, so that the second casing 20 is coaxially disposed on an inside of the first casing 10.

In the first embodiment of the present disclosure, the first magnet seat 12 is disposed on the first casing 10 and the electrical conductor ring 24 is disposed on the second casing 20. In other embodiments, a position of the first magnet seat 12 and a position of the electrical conductor ring 24 could be exchanged, wherein the first magnet seat 12 is changed to be connected to the periphery of the annular main body 22, and the electrical conductor ring 24 is changed to replace the first magnet seat 12 and has the inner protrusion 16 on a top side of an inner peripheral surface of the electrical conductor ring 24 in a radial direction of the electrical conductor ring 24 and the positioning flange 18 on a bottom side of an outer peripheral surface of the electrical conductor ring 24 and the first magnetic field direction M of each of the first magnets 14 of the changed first magnet seat 12 still passes through the changed electrical conductor ring 24. Thus, the relative rotation of the electrical conductor ring 24 and the first magnets 14 still generates the eddy current, so that when the second casing 20 rotates relative to the first casing 10, the countering resistance adapted to resist the rotation of the second casing 20 relative to the first casing 10 is generated.

Figure 10:
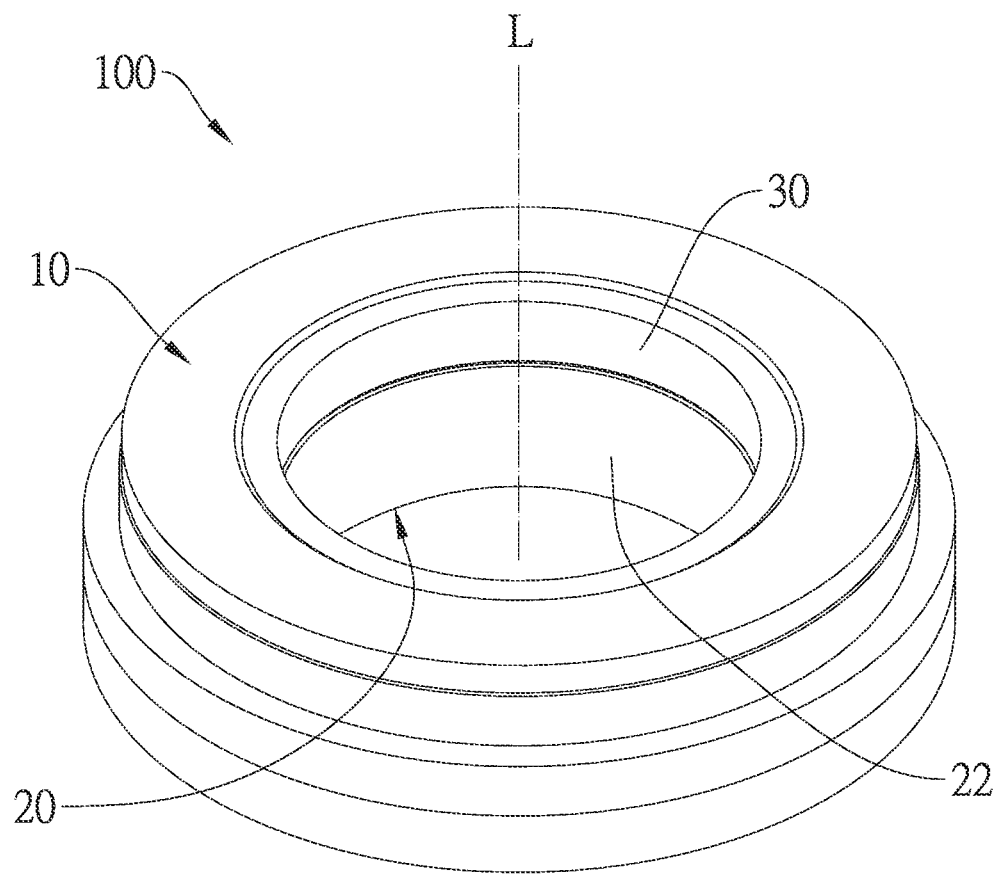
FIG. 10 is a perspective view of the magnetic bicycle headset according to a second embodiment of the present disclosure.
Figure 11:
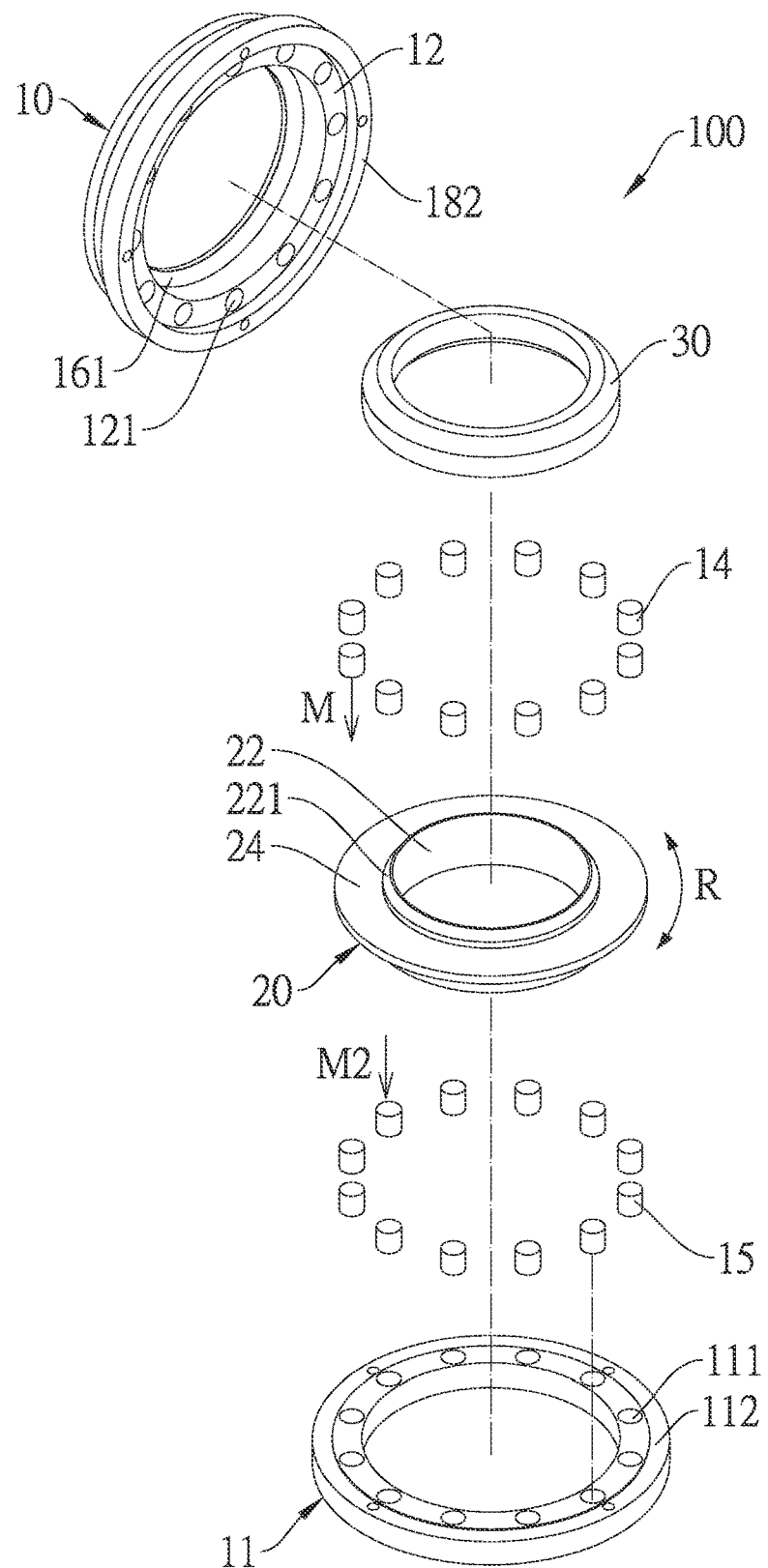
FIG. 11 is an exploded view of the magnetic bicycle headset according to the second embodiment of the present disclosure.
Figure 12:
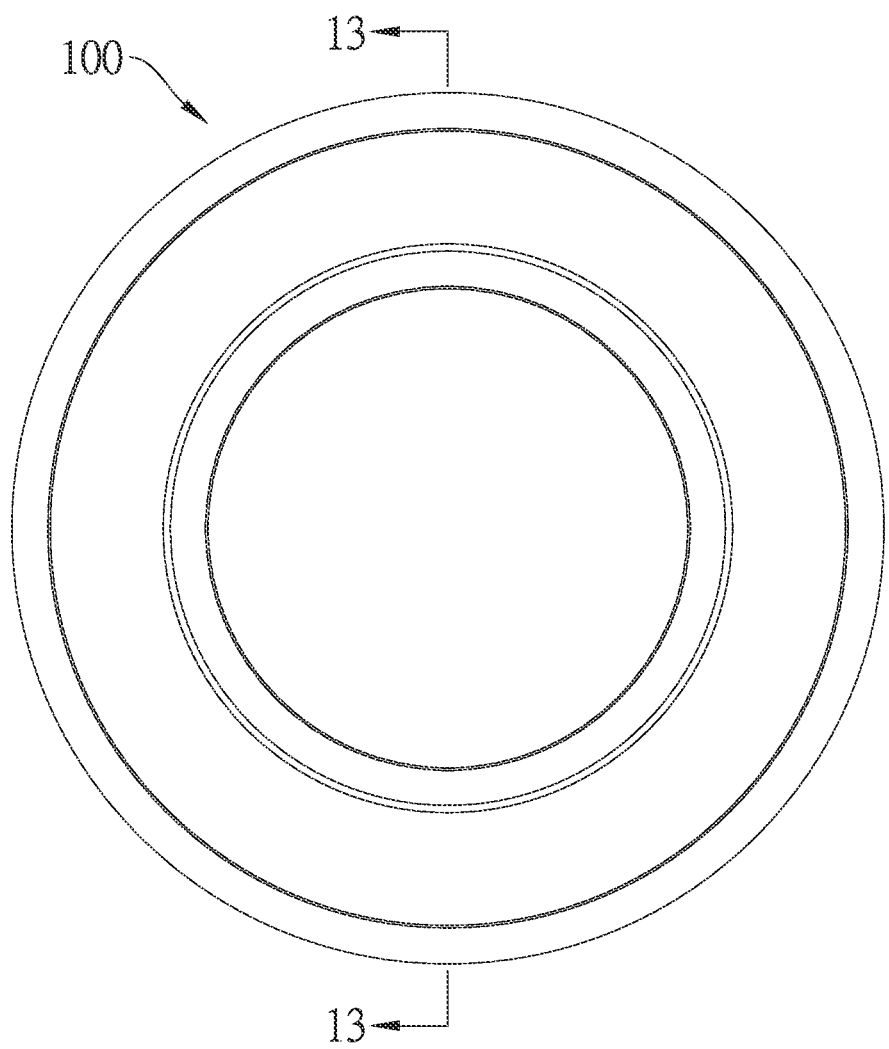
FIG. 12 is a top view of the magnetic bicycle headset according to the second embodiment of the present disclosure.
Figure 13:
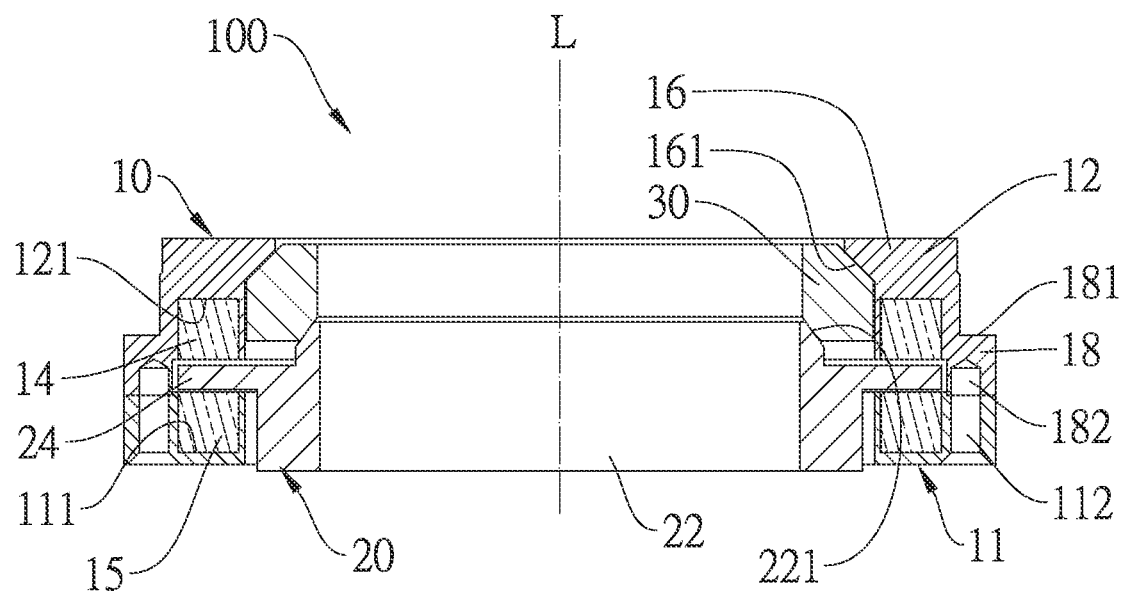
FIG. 13 is a sectional view along the 13-13 line in FIG. 12.

Apart from the first embodiment of the present disclosure, in which the first magnets 14 opposite to the electrical conductor ring 24 are only disposed on a side of the electrical conductor ring 24, a plurality of structures that is the same as the first magnets 14 could be respectively disposed on two opposite sides of the electrical conductor ring 24, so that the magnetic flux passing through the electrical conductor ring 24 could be enhanced, thereby enhancing the induced eddy current generated when the electrical conductor ring 24 rotates relative to the first magnet seat 12 and enhancing the subsequent countering resistance. A magnetic bicycle headset 100 according to a second embodiment of the present disclosure is illustrated in FIG. 10 to FIG. 13 and also includes a first casing 10, a second casing 20, and a bearing 30. The way of the first casing 10 and the second casing 20 being engaged with the bicycle in the second embodiment is the same as that of the first embodiment.

The first casing 10 has a first magnet seat 12. The first magnet seat 12 is an annular body, and a center of the first magnet seat 12 has an axis L. A plurality of first slots 121 is arranged around a bottom surface of the first magnet seat 12, wherein a plurality of first magnets 14 respectively fits in one of the first slots 121 for fixing, so that the first magnets 14 are arranged around the axis L of the first casing 10. A magnetic field of each of the first magnets 14 has a first magnetic field direction M approximately pointing downward along a direction of the axis L. An inner peripheral surface of the first magnet seat 12 in a radial direction of the first magnet seat 12 has an inner protrusion 16 that is annular, wherein a first abutting surface 161 adapted to work with the bearing 30 is formed on an inside of the inner protrusion 16. A bottom side of an outer peripheral surface of the first magnet seat 12 has a positioning flange 18. The positioning flange 18 and a periphery of the first magnet seat 12 jointly form a fitting portion 181. The positioning flange 18 radially protrudes from the outer peripheral surface of the first magnet seat 12. A portion of the positioning flange 18 protruding from the first magnet seat 12 has an engaging portion 182.

The engaging portion 182 is engaged with a second magnet seat 11. The second magnet seat 11 is a cylinder, wherein a portion of an outer periphery of the second magnet seat 11 has a fixing portion 112 detachably engaged with the engaging portion 182. In the second embodiment, the fixing portion 112 of the second magnet seat 11 is engaged with a bottom surface of the engaging portion 182 through screwing. A portion of an inner periphery of the second magnet seat 11 is located directly below the first magnet seat 12 and is separated from the first magnet seat 12 in the direction of the axis L. A plurality of second slots 111 is arranged around a surface of the second magnet seat 11 facing the first magnet seat 12 in the direction of the axis L (i.e., a top surface of the second magnet seat 11), wherein each of the second slots 111 is located directly below one of the first slots 121. A plurality of second magnets 15 respectively fits in one of the second slots 111 for fixing, so that the second magnet 15 are arranged around the axis L of the first casing 10. A magnetic field of each of the second magnets 15 has a second magnetic field direction M2.

The second casing 20 is an annular body and is opposite to the first casing 10 in the direction of the axis L. The second casing 20 has an annular main body 22, wherein a second abutting surface 221 is formed on an end edge of the annular main body 22 facing the first abutting surface 161 and is adapted to work with the bearing 30. A periphery of the annular main body 22 is connected to an electrical conductor ring 24. The electrical conductor ring 24 has a rotation direction R around the axis L. The electrical conductor ring 24 enters a gap between the first magnet seat 12 and the second magnet seat 11, wherein a length of the electrical conductor ring 24 in the direction of the axis L is less than a length of the gap between the first magnet seat 12 and the second magnet seat 11 in the direction of the axis L.

A magnetic field of each of the first magnets 14 passes through the electrical conductor ring 24, and the first magnetic field direction M of each of the first magnets 14 and the rotation direction R of the electrical conductor ring 24 intersect. A magnetic field of each of the second magnets 15 passes through the electrical conductor ring 24, and the second magnetic field direction M2 of each of the second magnets 15 and the rotation direction R of the electrical conductor ring 24 intersect. More specifically, the electrical conductor ring 24 directly faces upward the first magnets 14 in the direction of the axis L, and the first magnetic field direction M of each of the first magnets 14 passes through the electrical conductor ring 24; the electrical conductor ring 24 directly faces downward the second magnets 15 in the direction of the axis L, and the second magnetic field direction M2 of each of the second magnets 15 passes through the electrical conductor ring 24. A polarity of a magnetic pole of each of the second magnets 15 facing the electrical conductor ring 24 is opposite to a polarity of a magnetic pole of each of the first magnets 14 facing the electrical conductor ring 24, so that a direction of the magnetic field of the second magnets 15 passing through the electrical conductor ring 24 and a direction of the magnetic field of the first magnets 14 passing through the electrical conductor ring 24 are the same or are approximately the same.

In the second embodiment, the second casing 20 is a metallic electric conductor, and the annular main body 22 and the electrical conductor ring 24 are integrally formed as a monolithic unit, but not limited thereto. In other embodiments, the annular main body 22 of the second casing 20 and the electrical conductor ring 24 could be made of different materials, and the electrical conductor ring 24 could be connected to the periphery of the annular main body 22 for fixing through being stuck, riveting, welding, or screwing.

Two opposite sides of the bearing 30 respectively abut against the first abutting surface 161 and the second abutting surface 221 for fixing. Thus, the bearing 30 is disposed between the first abutting surface 161 and the second abutting surface 221, so that the second casing 20 is smoothly rotatable relative to the first casing 10 along the rotation direction R. In other embodiments, the number of the first magnets 14 of the first magnet seat 12 could be one or plural; when the number of the first magnet 14 is one, the first magnet 14 could be a magnet in annular shape; the number of the second magnets 15 of the second magnet seat 11 could be one or plural; when the number of the second magnet 15 is one, the second magnet 15 could be a magnet in annular shape; the first magnets 14 and the second magnets 15 could be respectively arranged at uniform intervals, different intervals, or a combination thereof, but not limited thereto.

When the magnetic bicycle headset 100 according to the second embodiment of the present disclosure is mounted on the bicycle and the second casing 20 rotates relative to the first casing 10, the electrical conductor ring 24 of the second casing 20 rotates relative to the first magnets 14 and the second magnets 15, so that both of a magnetic flux of the magnetic field of each of the first magnets 14 passing through the electrical conductor ring 24 and a magnetic flux of the magnetic field of each of the second magnets 15 passing though the electrical conductor ring 24 change, thereby generating an induced eddy current on a surface of the electrical conductor ring 24. By an interaction among a magnetic field of the eddy current, the magnetic field of each of the first magnets 14, and the magnetic field of each of the second magnets 15, a countering resistance adapted to resist the rotation of the second casing 20 is generated, so that a speed and a degree of the relative rotation of the electrical conductor ring 24, the first magnets 14, and the second magnets 15 could be reduced, and a speed and a degree of the rotation of the second casing 20 relative to the first casing 10 could be reduced. In this way, when a stem with the magnetic bicycle headset 100 accidentally turns, the danger of falling down from the bicycle due to the stem suddenly oversteering could be prevented.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A magnetic bicycle headset, comprising:
   a first casing adapted to be engaged with a headtube of a bicycle and having an axis and a first abutting surface;
   a second casing adapted to be engaged with a fork of the bicycle and having a second abutting surface; and
   a bearing disposed between the first abutting surface and the second abutting surface;
   wherein either the first casing or the second casing has a first magnet seat; the first magnet seat has at least one first magnet, wherein a magnetic field of the at least one first magnet has a first magnetic field direction; the other one of the first casing and the second casing has an electrical conductor ring; the electrical conductor ring rotates relative to the at least one first magnet around the axis, making the magnetic field of the at least one first magnet movably pass through the electrical conductor ring.

2. The magnetic bicycle headset as claimed in claim 1, wherein the first casing has the first magnet seat, and the second casing has the electrical conductor ring.

3. The magnetic bicycle headset as claimed in claim 2, wherein the first magnet seat is an annular body; a plurality of first slots is arranged around the first magnet seat; the at least one first magnet comprises a plurality of first magnets; each of the plurality of first magnets fits in one of the plurality of the first slots; an outer peripheral surface of the first magnet seat has a positioning flange; the first abutting surface is an inclined surface and is formed on a top side of an inner peripheral surface of the first magnet seat.

4. The magnetic bicycle headset as claimed in claim 3, wherein the second casing is a metallic electric conductor and has an annular main body adapted to be engaged with the fork of the bicycle; the electrical conductor ring is connected to a periphery of the annular main body; the second abutting surface is an inclined surface and is formed on the annular main body.

5. The magnetic bicycle headset as claimed in claim 4, wherein the positioning flange is connected to a dustproof ring surrounding a periphery of the electrical conductor ring.

6. The magnetic bicycle headset as claimed in claim 4, wherein the positioning flange radially protrudes from the outer peripheral surface of the first magnet seat and has an engaging portion; the engaged portion is engaged with a second magnet seat; the second magnet seat is opposite to the first magnet seat and has at least one second magnet, wherein a magnetic field of the at least one second magnet has a second magnetic field direction; a length of the electrical conductor ring in a direction of the axis is less than a length of a gap between the first magnet seat and the second magnet seat in the direction of the axis; the electrical conductor ring enters the gap between the first magnet seat and the second magnet seat, and the magnetic field of the at least one second magnet passes through the electrical conductor ring; a polarity of a magnetic pole of the at least one second magnet facing the electrical conductor ring is opposite to a polarity of a magnetic pole of each of the plurality of first magnets facing the electrical conductor ring.

7. The magnetic bicycle headset as claimed in claim 6, wherein the second magnet seat is an annular body; a plurality of second slots is arranged around a top surface of the second magnet seat; the at least one second magnet comprises a plurality of second magnets; each of the plurality of second magnets fits in one of the plurality of second slots.

* * * * *